United States Patent [19]

Donovan et al.

[11] Patent Number: 5,027,109
[45] Date of Patent: Jun. 25, 1991

[54] APPARATUS AND METHOD FOR MINIMIZING UNDESIRED CURSOR MOVEMENT IN A COMPUTER CONTROLLED DISPLAY SYSTEM

[76] Inventors: Paul M. Donovan, 200 Elm St., Menlo Park, Calif. 94025; Swee T. Chia, BLK 824, Yiishun Street 81 #02-590, Singapore, Singapore, 2776

[21] Appl. No.: 363,586

[22] Filed: Jun. 8, 1989

[51] Int. Cl.$^5$ ............................................. G09G 5/08
[52] U.S. Cl. .................................. 340/706; 340/709; 340/710
[58] Field of Search ..................... 340/710, 709, 706; 250/231.19, 231.18, 231.17, 231.16, 237 R, 23.15, 231.14, 231.13, 231.12, 231.11, 231.1; 33/1 M; 341/13, 94, 126, 143; 307/358, 353, 352; 328/151

[56] References Cited

U.S. PATENT DOCUMENTS

| | | | |
|---|---|---|---|
| Re. 32,632 | 3/1988 | Atkinson | 340/710 |
| Re. 32,633 | 3/1988 | Hovey et al. | 340/709 |
| 4,212,000 | 7/1980 | Yamada | 341/7 |
| 4,354,102 | 10/1982 | Burns et al. | 250/203.1 |
| 4,463,272 | 7/1984 | Tucker | 307/358 |
| 4,464,652 | 8/1984 | Lapson et al. | 74/471 XY |
| 4,634,859 | 1/1987 | Martell | 250/231.11 |
| 4,717,883 | 1/1988 | Browning | 307/353 |
| 4,789,836 | 12/1988 | May | 307/358 |

Primary Examiner—Alvin E. Oberley
Assistant Examiner—Richard Hjerpe
Attorney, Agent, or Firm—Blakely, Sokoloff, Taylor & Zafman

[57] ABSTRACT

An apparatus and method of minimizing undesired cursor movement in a computer controlled display system are disclosed. A cursor control device capable of generating an electrical signal indicative of a position of the cursor control device is provided. At least two temporally spaced portions of the electrical signal are sampled. Each of the samples is taken within a designated period of time. The period of time designated is a function of the predicted rate of movement of the cursor control device. The sampled portions are compared with each other and to an electrical signal previously sampled. The comparisons are analyzed for determining whether the cursor should be signaled to move on the display of the computer controlled display system. Use of this digital logic hysteresis technique minimizes "jitter" of the cursor when the cursor control device is substantially stationary.

32 Claims, 9 Drawing Sheets

APPARATUS AND METHOD FOR MINIMIZING UNDESIRED CURSOR MOVEMENT IN A COMPUTER CONTROLLED DISPLAY SYSTEM

BACKGROUND OF THE INVENTION

1. Field of the Invention

The present invention relates to cursor control devices for computer controlled display systems and more particularly to an apparatus and method for minimizing undesired cursor movement in such a computer controlled display system.

2. Description of the Related Art

In many computer controlled display systems, it is desirable to allow the user to control the position of a cursor, or the like, by means which are external from the main computer keyboard. For example, a user may be required to repetitively choose software options displayed on a cathode ray tube (CRT), or may desire to input data in a diagram format into the computer system. In such situations, traditional keyboard input systems are not as effective as cursor control devices, each commonly referred to as a "mouse" or a "trackball".

Some cursor control devices utilize contacting encoders. Other popular cursor control devices utilize optical encoders. In either instance, a problem exists in undesired cursor movement while the cursor device is stationary. This undesired cursor movement is commonly referred to as "jitter".

Most optical encoders presently in use utilize at least one light emitting diode (LED) in conjunction with at least two open collector phototransistors, the LEDs transmitting photons to the bases of the phototransistors, allowing the phototransistors to conduct at a certain threshold. Typically, an encoding disc (i.e. aperture wheel) is provided with radially spaced slits to alternately provide or interrupt passage of light to the phototransistors as the encoding disc moves in association with movement of the cursor control device. Thus, a scheme is created to either provide the dual phototransistors in dual off states, off-on states, on-off states, or dual on states. The variations in these states provide indications of movement of the cursor control device.

A problem exists when the cursor control device is stationary and the encoding disc happens to be disposed such that an edge of the encoding disc which forms a slit is disposed on the path of the light being transmitted from an LED to a phototransistor. In many prior art cursor control devices, the phototransistors are sampled at a certain time to determine whether they are off or on. Thus, if the edge is on the light path of a specific phototransistor, the phototransistor might receive enough photons to report on, or it may not. In such an instance, the cursor may jitter even though the cursor control device is substantially stationary.

Examples of prior art cursor control devices utilizing optical encoding means are provided in U.S. Pat. No. Re. 32,633, issued to D. Hovey, entitled "Cursor Control Device" and U.S. Pat. No. Re. 32,632, issued to W. D. Atkinson, entitled "Display System". Both the '632 and '633 patents are assigned to the present assignee.

In the case of a contacting encoder, contacting means are provided on an encoding disc to alternately provide or interrupt conduction of an electrical current. Similarly, when the cursor control device is substantially stationary and the encoding disc is on an edge, there can also exist such a "jitter" of the cursor on the computer display.

As will be disclosed below, present applicants have developed a novel apparatus and method for minimizing undesired cursor movement while the cursor control device is substantially stationary. The present invention is applicable to both optical encoders and contacting encoders.

SUMMARY OF THE INVENTION

An apparatus and method of minimizing undesired cursor movement in a computer controlled display system are disclosed. A cursor control device capable of generating an electrical signal indicative of a position of the cursor control device is provided. At least two temporally spaced portions of the electrical signal are sampled. Each of the samples is taken within a designated period of time. The period of time designated is a function of the predicted rate of movement of the cursor control device. The sampled portions are compared with each other and to an electrical signal previously sampled. The comparisons are analyzed for determining whether the cursor should be signaled to move on the display of the computer controlled display system. Use of this digital logic hysteresis technique minimizes "jitter" of the cursor when the cursor control device is substantially stationary.

BRIEF DESCRIPTION OF THE DRAWINGS

FIGS. 6-1 and 6-2 are block diagrams of the Application Specific Integrated Circuit (ASIC) which may be used to implement the present invention.

FIGS. 7-1 and 7-2 are logic diagrams of a portion of the ASIC of FIG. 6, pertaining to the mechanism for performing pulse generation and pulse recapture.

The same elements or parts throughout the figures of the drawings are designated by the same reference characters.

DETAILED DESCRIPTION OF THE PREFERRED EMBODIMENTS

I. General System

Figure 1:
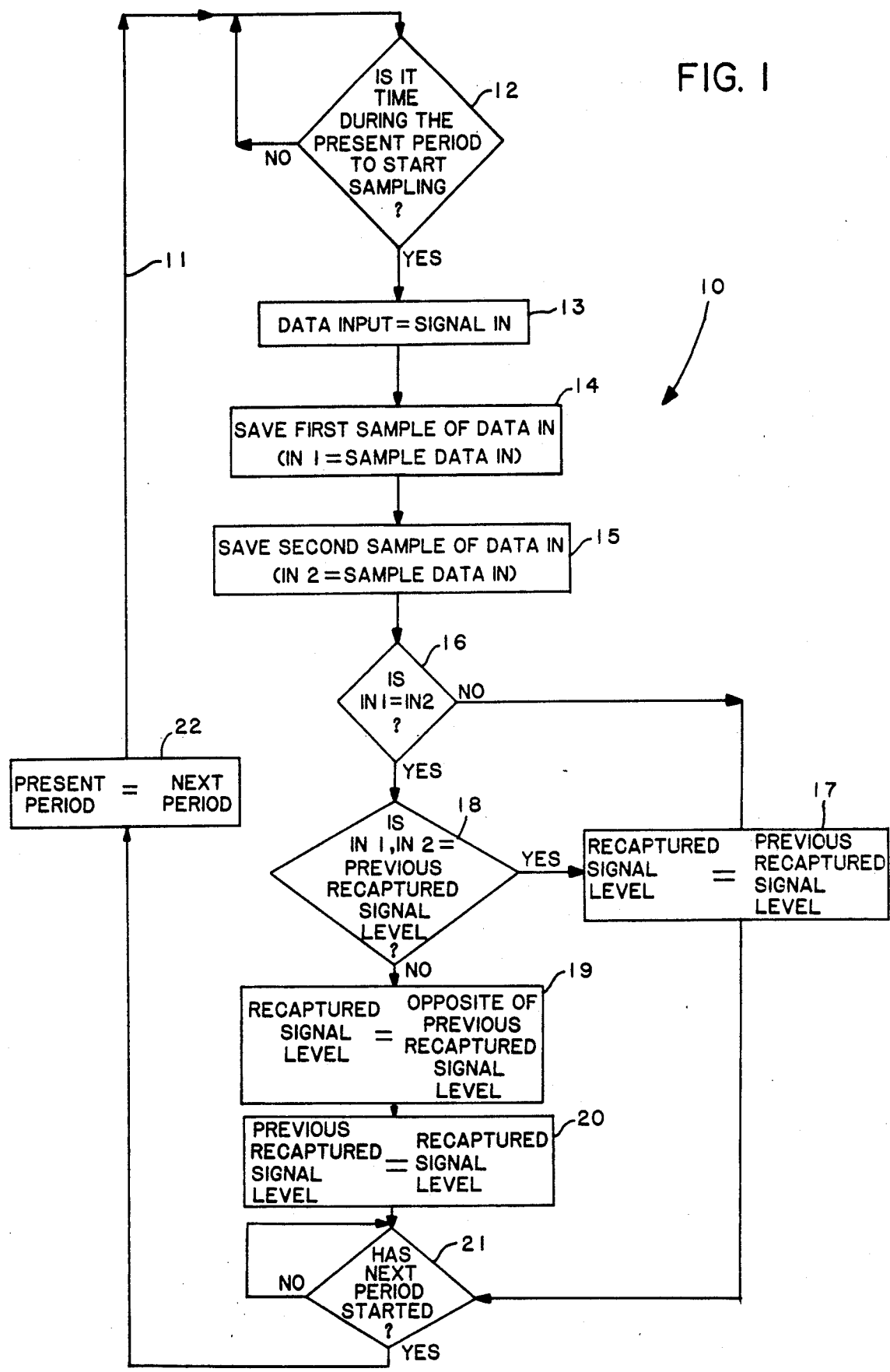
FIG. 1 is a flow diagram illustrating the steps utilized by the present invention to minimize unwanted movement of a cursor in a computer controlled display system.

Referring now to the drawings and the characters of reference marked thereon, FIG. 1 is a block diagram designated generally as 10, illustrating the steps utilized by the present invention to minimize undesired movement of a cursor on a computer controlled display system. This figure represents the logic of a portion of an integrated circuit (or correlative analog device) located within a cursor control device. This portion of the integrated circuit receives a signal 11 which has originated from another portion of the integrated circuit, the signal being a clock used for timing samples. (A specific implementation of such a cursor control device will be described in detail below.)

A period of time for taking samples must be determined depending on the particular cursor control device utilized. This designated period of time is a function of the predicted rate that the user is expected to move the device. For example, if a mouse is used, such movement corresponds to movement of the mouse on the surface on which it rests. If a trackball is used, such movement corresponds to the motion of a user's hand over the trackball.

As noted in Decision Block 12, a determination is made as to whether it is time, during the present period, to start the sampling process. In the event that the time is appropriate to start such a sampling, the data input is the same as the signal in, as shown in Process Block 13.

During the designated period of time, at least two temporally spaced portions of the electrical signal are sampled (i.e. Process Blocks 14, 15).

An inquiry is then made as to whether the signal level of the first sample of data saved, $In_1$, is equal to the signal level of the second sample of data saved, $In_2$ (Decision Block 16).

If the two samples ($In_1$, $In_2$) are not equal, then the recaptured signal level is set to the previous recaptured signal level, as shown in Process Block 17. (This will subsequently be compared to forthcoming signals to determine whether the cursor should be moved.)

As shown in Decision Block 18, if the compared samples ($In_1$, $In_2$) are determined to be equal, their signal level is compared to a directly previously recaptured signal level, as shown in Decision Block 18.

If the previous recaptured signal level is equal to the samples $In_1$, $In_2$, then the recaptured signal level is set equal to the previous recaptured signal level (Process Block 17). If they are not equal to the previous recaptured signal level, then the present recaptured signal level is set equal to the opposite of the previous recaptured signal level, as shown in Process Block 19. The previous recaptured signal level is set equal to the present recaptured signal level to prepare the signal for the forthcoming sample portions of the next period (Process Block 20).

A determination is then made as to whether the next period of time has started, as shown in Decision Block 21. If the next period of time for taking samples has started, the present period is set equal to the next period, as shown in Process Block 22 and the query of Decision Block 12 is again made. A specific implementation of the flow chart of FIG. 1 will be described below.

II. Cursor Control Device

Figure 2:
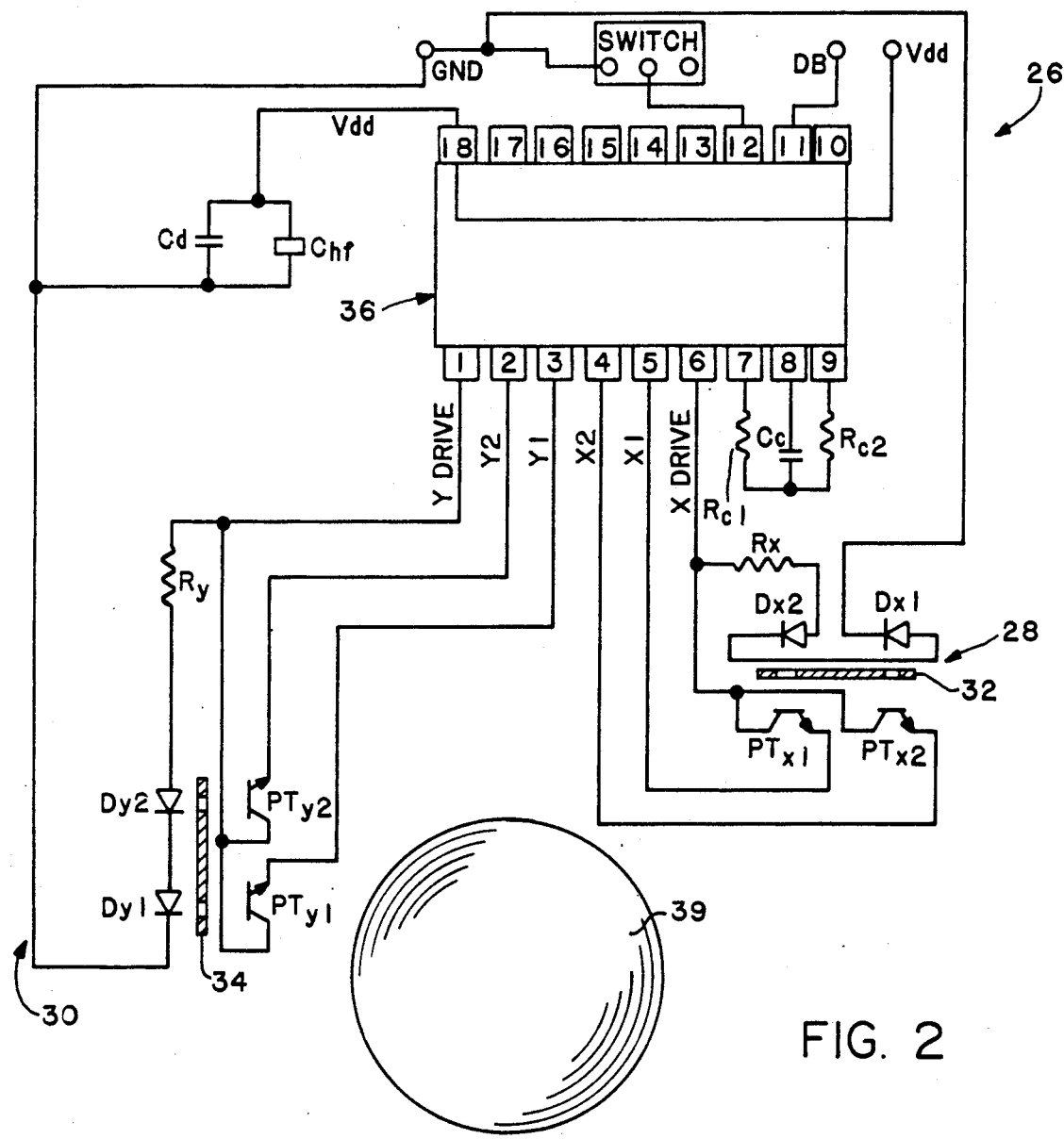
FIG. 2 is a schematic top view of a cursor control device which may be used to implement the jitter minimizing scheme illustrated in FIG. 1.

Referring now to FIG. 2, a schematic diagram of a top view of a cursor control device, designated generally as 26 is illustrated. The cursor control device is a mouse design developed by present assignee which uses a novel optical encoding means having a pulsed drive for minimizing power consumption. The pulsed drive pulses both the light emitting iodes and the phototransistors in synchronization, thereby minimizing power consumption. Use of such a pulsed device is fully disclosed and claimed in the co-pending patent application of present co-applicant, P. M. Donovan, entitled "Apparatus and Method for Optical Encoding", U.S. Ser. No. 07/357,419, assigned to the present assignee. The subject matter of that co-pending patent application is hereby incorporated by reference.

As shown in FIG. 2, the cursor control device 26 includes a first optical encoding assembly 28, for encoding along the horizontal or X-axis, and a second optical encoding assembly 30, for optically encoding along the Y-axis.

Positionable light interrupting means are designated as 32, 34 and represent aperture wheel assemblies, also known in the art as encoder disc assemblies. The encoder disc assemblies 32, 34 are provided to convert the movement of the cursor control device 26 into signals indicative of X-Y locations defined on the display system of the computer. The optical encoding assemblies 28, 30 receive signals from, and return signals to, an integrated circuit, designated generally as 36, in response to movement of a ball 39, as will be disclosed below.

Figure 3:
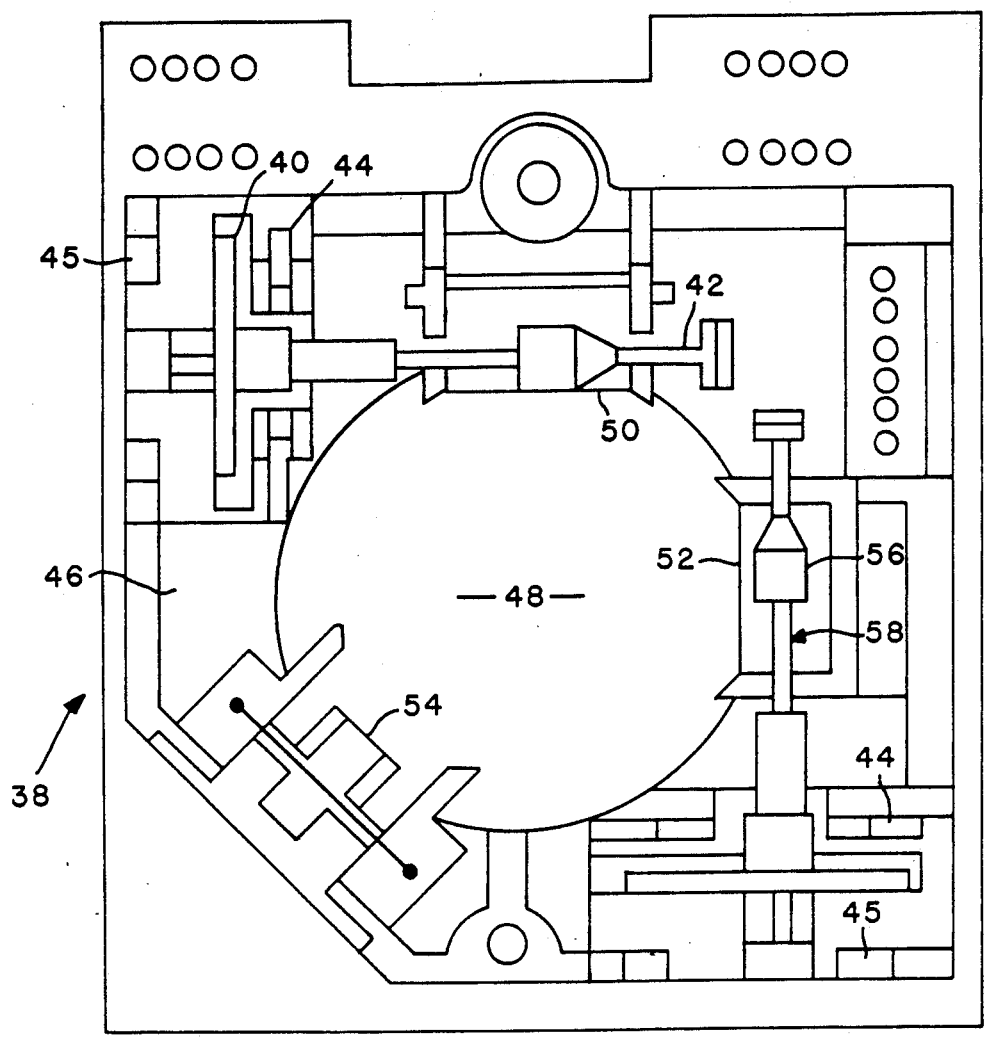
FIG. 3 is a top view of a cursor control device, illustrating the mechanical aspects of such a device.
Figure 5:
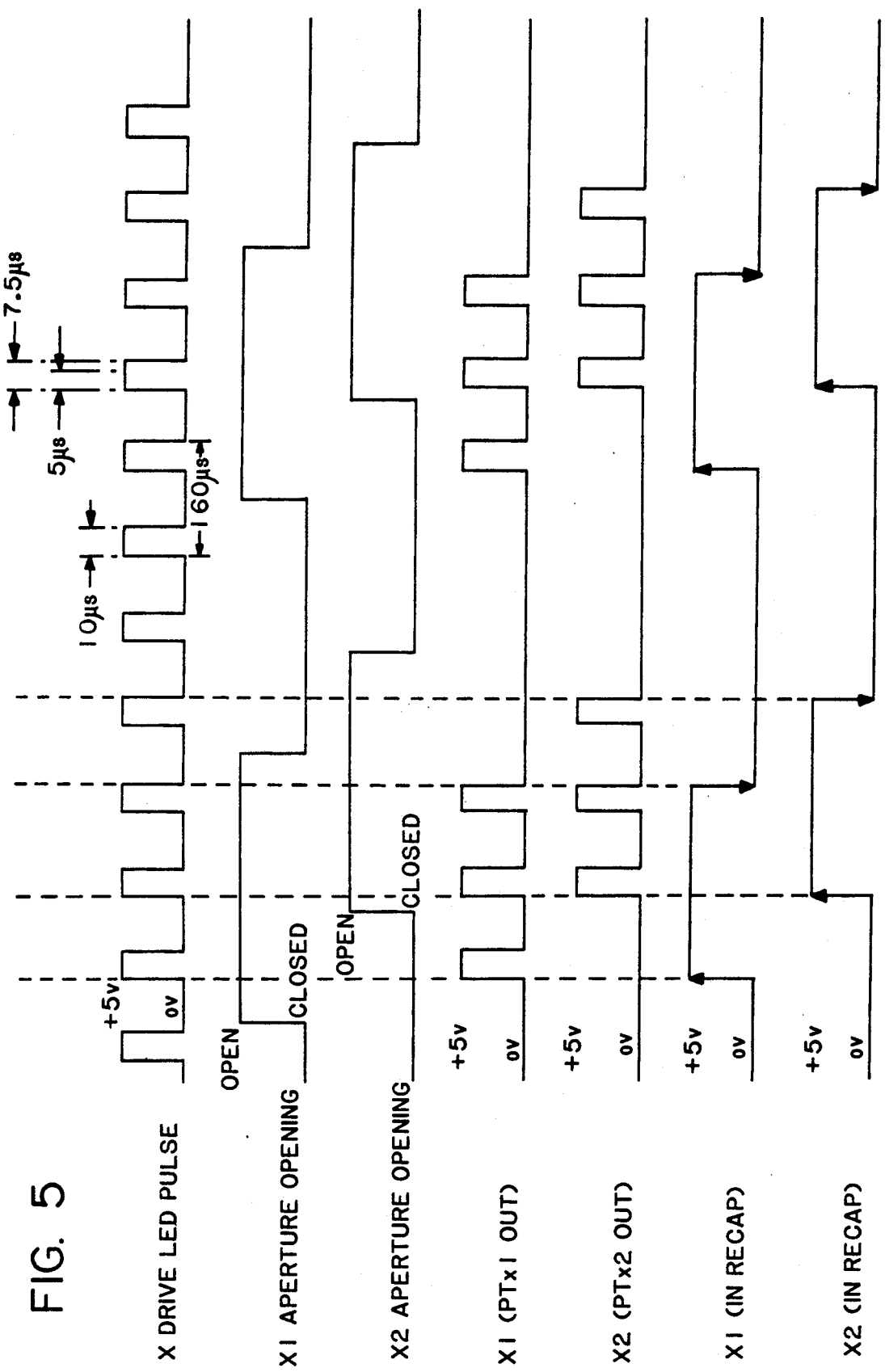
FIG. 5 is a diagrammatical illustration of sample waveforms produced by the present invention, including quadrature outputs of the present invention, indicative of X positions on a computer display system.

Referring now to FIG. 3, which is essentially a reproduction of FIG. 5 of U.S. Pat. No. Re. 32,632, entitled "Display System" issued to W. D. Atkinson and of U.S. Pat. No. Re. 32,633, issued to D. Hovey, et al., entitled "Cursor Control Device", a top view of the mechanical features of a mouse 38 are illustrated. Both the '632 and '633 patents are assigned to the present assignee. The subject matter in those patents is hereby incorporated by reference.

Briefly, referring to FIG. 3, each encoder assembly includes an aperture wheel or encoder disc 40 coupled to a roller shaft 42. In addition, each encoder disc 40 is provided with a plurality of radially disposed slots (described below) which interrupt the light beams generated by the LEDs or photoemitters 44 which are being transmitted to the photodetectors 45 which collect the light and become electrically conductive when a threshold level is reached. The frame 46 of the cursor control device 38 is provided with a domed housing 48 having three cut-out locations 50, 52, and 54. As illustrated, cut-outs 50 and 52 are disposed substantially at 90 degrees with respect to one another, with cut-out 54 being oriented generally symmetrically opposite the other cut-outs. A cylindrical contact member 56 surrounds each roller shaft 42 at each respective cut-out location, as illustrated. Each encoder disc assembly 58 is mounted on the frame 46 in a manner allowing rotation of the roller shaft 42 and encoder disc 40 with a minimum of friction. In operation, a ball is disposed within the dome 48 of the frame 46, and retains such that it is maintained in contact with both cylindrical contact members 56. The rotation of the ball within the dome 48 in turn causes the rotation of each roller shaft 56 and its respective encoder disc 40. The beam interruptions from the rotation of each encoder disc 40 produce signal pulses representing increments of motion, while the order in which the light beams are interrupted indicates the direction of motion of the cursor control device 38.

Figure 4:
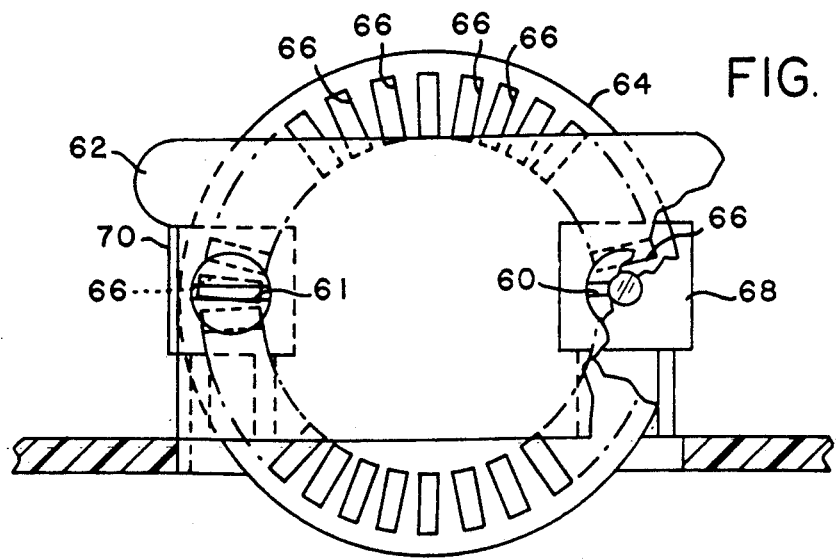
FIG. 4 is a diagrammatical illustration, partially cut away, of the alignment of the photodetectors in relation to the encoder disk and mask encoder.

In the most current versions of the mouse used by Apple Computer, Inc., the aperture or encoder disc is positioned behind a stationary board or mask encoder having two openings, one for each LED/photodetector combination. Referring now to FIG. 4, such an arrangement is illustrated. This figure is from the point of view of the photoemitters. The light travels through slitted openings 60, 61 in stationary mask encoder 62. The encoder disc 64 is positioned to receive the light transmitted through the openings 60, 61 and to either transmit the light through slots 66 to the photodetectors 68, 70 or to interrupt the light. The mask encoder 62 is provided to allow light to be transmitted through only one slit 66 at a time for each photodetector. The photodetectors 68, 70 are disposed such that if one detector is fully exposed by a slot 66 of the encoder disc 64, the other detector is only partially exposed, ideally half exposed. Thus, in addition to the increments of motion of the cursor control device over a surface, the direction of motion may also be determined.

Assume, for the sake of example, that the cursor control device 38 is being moved over a surface at a constant speed along the X-direction. Referring now to FIG. 5, a sample output, $X_{drive}$, from the integrated circuit chip 36 to the LEDs ($D_{x1}$, $D_{x2}$) is illustrated. Each LED pulses at a rate of 160±25 μS with a pulse width of 10 μS. The graphs, designated X1 and X2 aperture openings, therefore show equally spaced, but displaced, open and closed regions, with respect to time.

The graphs, X1 ($PT_{x1out}$) and X2 ($PT_{x2out}$), illustrate the electrical signals into the integrated circuit 36. The electrical signals from the photodetectors $PT_{x1}$, $PT_{x2}$ are then converted to electrical quadrature signals by integrated circuit 36 shown by graphs X1 (in Recap) and X2 (in Recap). Such quadrature signals are utilized by the integrated circuit in its counting scheme to detect cursor control movement. Thus, the signals from each pair of channels may be decoded such that the X-Y direction of motion may be determined for the particular order of transition changes from each channel along an axis.

As previously noted, the pulsed synchronization of the photoemitters and photodetectors for each channel results in minimized power consumption. Furthermore, in the preferred embodiment the integrated circuit 36 generates inputs, $X_{drive}$ and $Y_{drive}$, which are approximately 180° out of phase. Therefore, power consumption is further minimized by minimizing the peak power consumption.

III Application Specific Integrated Circuit

Referring back now to FIG. 2, it is noted that the integrated circuit 36 utilized is an application specific integrated circuit (ASIC). The ASIC 36 performs the on-board functions of an encoding mouse or trackball and transmits the results over a bus to a controlling CPU. As noted, the lowest practical power consumption is desired. The ASIC is capable of driving the light source means in a pulsed mode to achieve this goal. Use of a pulsed mode limits the current.

Pin 1 provides the Y pulse drive (vertical) and is connected directly to the collectors of the Y photoemitters $PT_{y1}$ and $PT_{y2}$. The Y pulse drive is also connected to a resistor $R_y$ which feeds the Y LEDs $D_{y1}$, $D_{y2}$.

Pin No. 2 is the Y2 input pin and is used for detecting a phototransistor input signal generated during a vertical movement of the cursor control device. Pin No. 3 is a Y1 input pin which is also used for detecting a phototransistor input signal generated during such a vertical movement of the cursor control device.

Pins 4 and 5 are the X2 input pin and the X1 input pin, respectively, used for detecting a phototransistor input signal generated during a horizontal movement of the cursor control device.

Pin No. 6 is for the X pulse drive (horizontal) and is connected directly to the collectors of the X phototransistors $PT_{x1}$, $PT_{x2}$. The $X_{drive}$ is also connected to a resistor $R_x$ which feeds the photoemitters $D_{x1}$, $D_{x2}$.

Pin No. 7 is an input pin used as a feedback for Resistor $R_{c1}$ for the oscillator clock. Pin No. 8 is an output pin connected to a capacitor $C_c$ which is used for the oscillator. Pin No. 9 is an output pin connected to an external timing resistor $R_{c2}$ used for the oscillator.

Pin No. 10 is connected to ground.

Pin No. 11 is connected to an input/output line for the data bus, DB, to and from the CPU.

Pin No. 12 is connected to a switch input, currently used.

Pin No. 13 is for a second switch input.

Pins Nos. 14 to 17 are used for test purposes.

Pin No. 18 is used as the power input, Vdd, to the ASIC. A decoupling capacitor $C_d$ and high frequency capacitor $C_{hf}$ are utilized for stabilizing the power input line.

Table 1 provides illustrative component values for the components shown in FIG. 2.

TABLE 1

| | |
|---|---|
| $R_x$, $R_y$ | 1k Ω ± 5% |
| $C_c$ | 10 pf ± 5% |
| $C_d$ | 0.1 μf |
| $C_{hf}$ | 1.0 μf |
| $D_{x1}$, $D_{x2}$, $D_{y1}$, $D_{y2}$ | Omron EEL 104 HB |
| $R_{c1}$ | 56.2k Ω ± 1% |
| $R_{c2}$ | 22.1k Ω ± 1% |
| $R_{c1}$, $R_{c2}$ & $C_c$ | comprise an 800 Khz |
| oscillator | clock |
| $PT_{x1}$, $PT_{x2}$, $PT_{y1}$, $PT_{y2}$ | EETP 104 HB |
| $V_{dd}$ | 5 V |
| Pulse Characteristics | |
| X, $Y_{drive}$ | pulse width 10 μs |
| | period 160 μs ± 16% |

It is also noted that the inputs to Pins Nos. 2–5 include internal 70 kΩ pull-down resistors connected to ground. Pin No. 12 is internally connected to a 930 kΩ pull-up resistor and is connected to the 5 volts input. Pin No. 3 has an input which is internally connected to a 930 kΩ pull-up resistor.

As noted, the X pulse is 180° out of phase with the Y pulse. This conserves power inasmuch as both pulse drives will not be high at the same time.

Figures 1, 6:
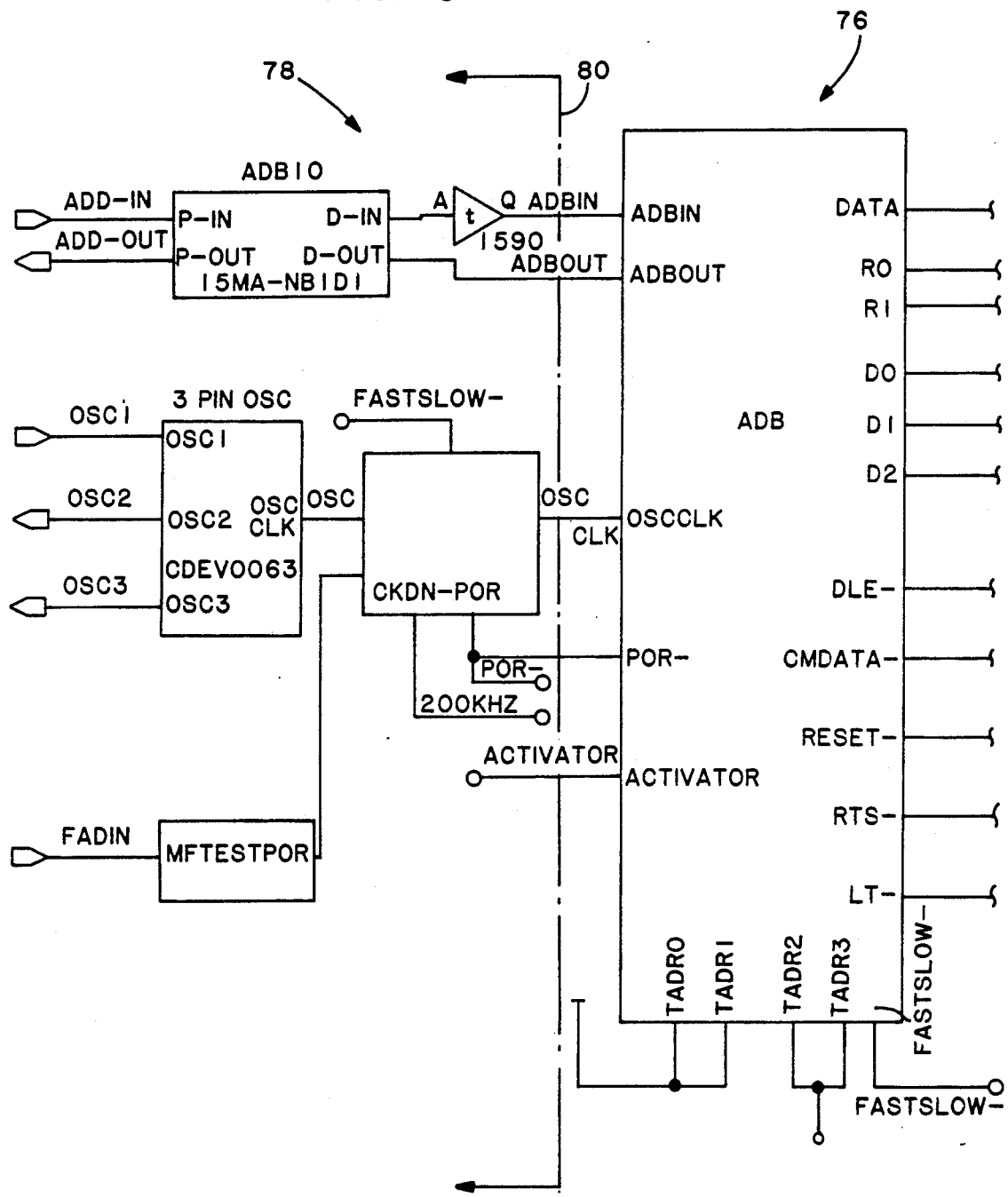
Figures 2, 6:
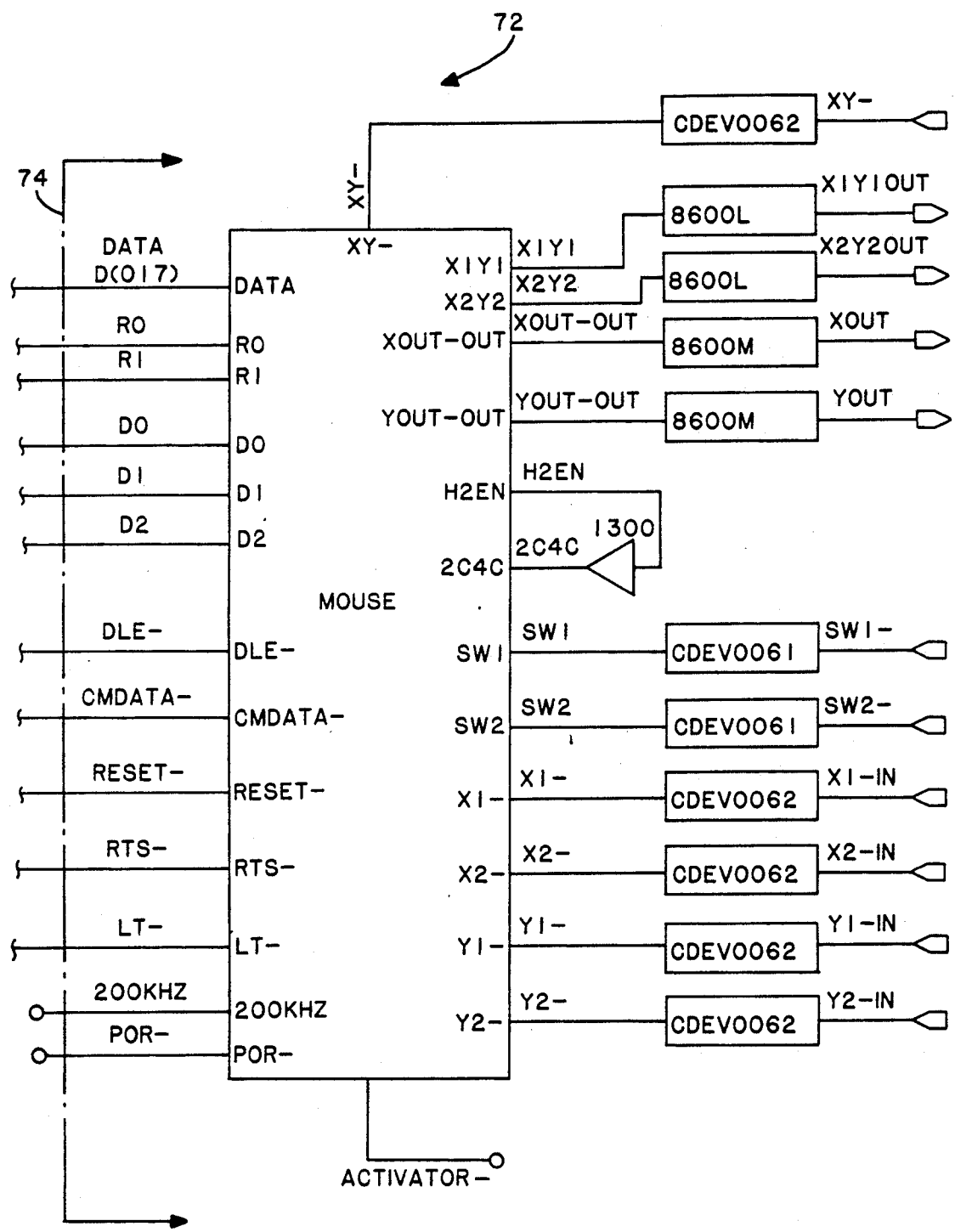

Referring now to FIG. 6, a block diagram of the ASIC is illustrated. It can be seen that the chip can be viewed as three distinct portions. The mouse specific portion, designated generally as 72, to the right of dashed line 74, is the portion used for forming the desired pulses required for operation, as noted above, and will therefore be described in detail. Portion 76 illustrates the circuit for the data bus to the CPU and portion 78, to the left of dashed line 80, refers to the clock. Portions 76 and 78 will therefore not be discussed in detail.

The CDEV0061 input pad is used for the switch inputs, SW1_ and SW2_. The pad includes an inverting Schmitt input and 930 kΩ Pull-Up resistor.

The CDEV0062 input pad includes an inverting Schmitt Input and 70 kΩ Pull-Down resistor and is used as an input pad for the XY_, X1_IN, X2_IN, Y1_IN, and Y2_IN inputs.

The MFTESTPOR pad is an input pad for Power On Reset and Test Pad. It is used for the PADIN input pin.

The CDEV0063 Pad includes a 3 Pin Low Current R-C Oscillator. It is used as an input pin for the feedback resistor, as an output pin for the timing capacitor, and as an output pin for the timing resistor.

The 15MA-NBIDI pad is a 15 milliamp input/output pad used for the DB I/O data line.

The 8600 M pad is a non-inverting output buffer pad with medium drive current used for $X_{drive}$ and $Y_{drive}$.

The 8600 L pad is a non-inverting output buffer pad with low drive current used for test pins $X1Y1_{out}$ and $X2Y2_{out}$.

Figures 1, 7:
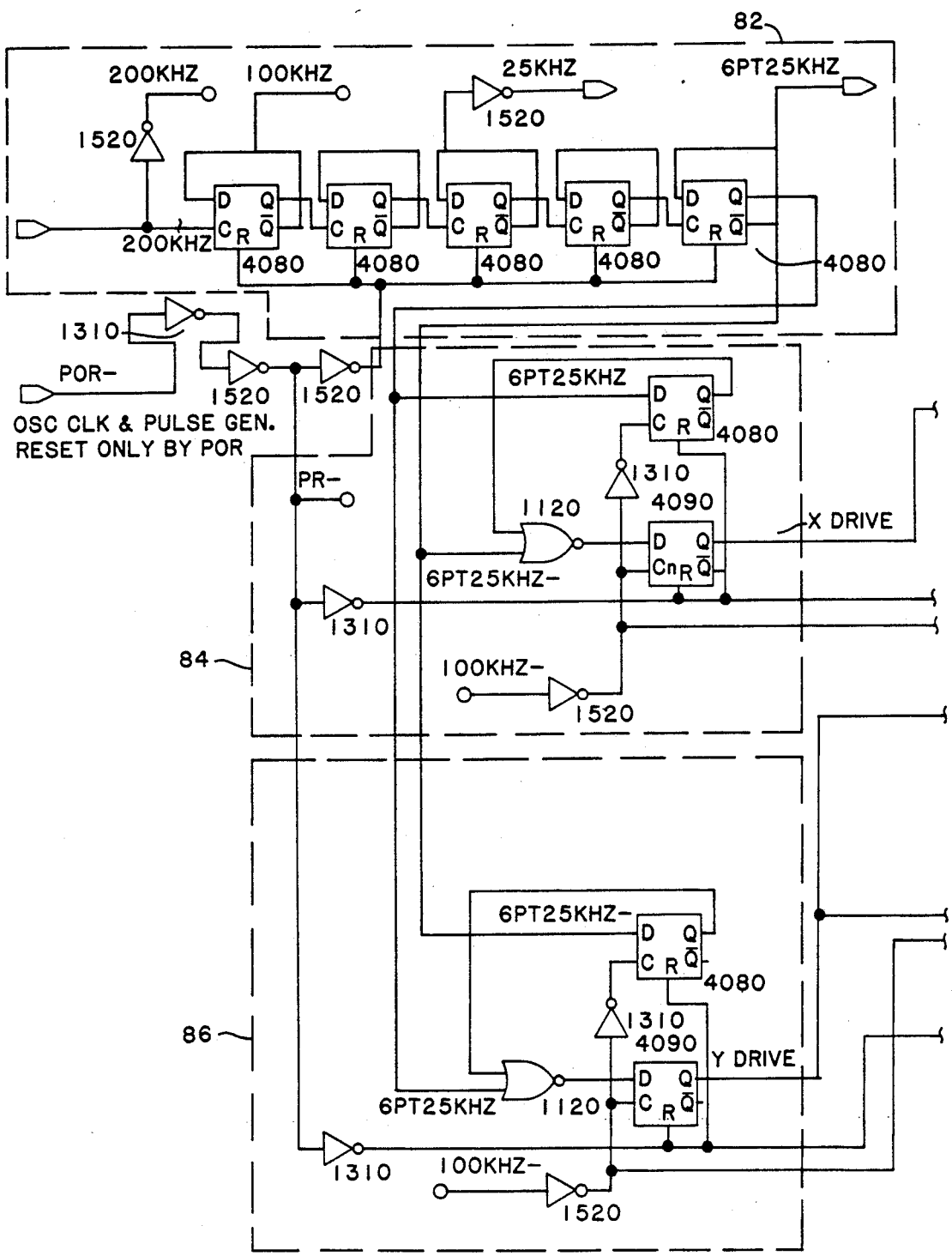
Figures 2, 7:
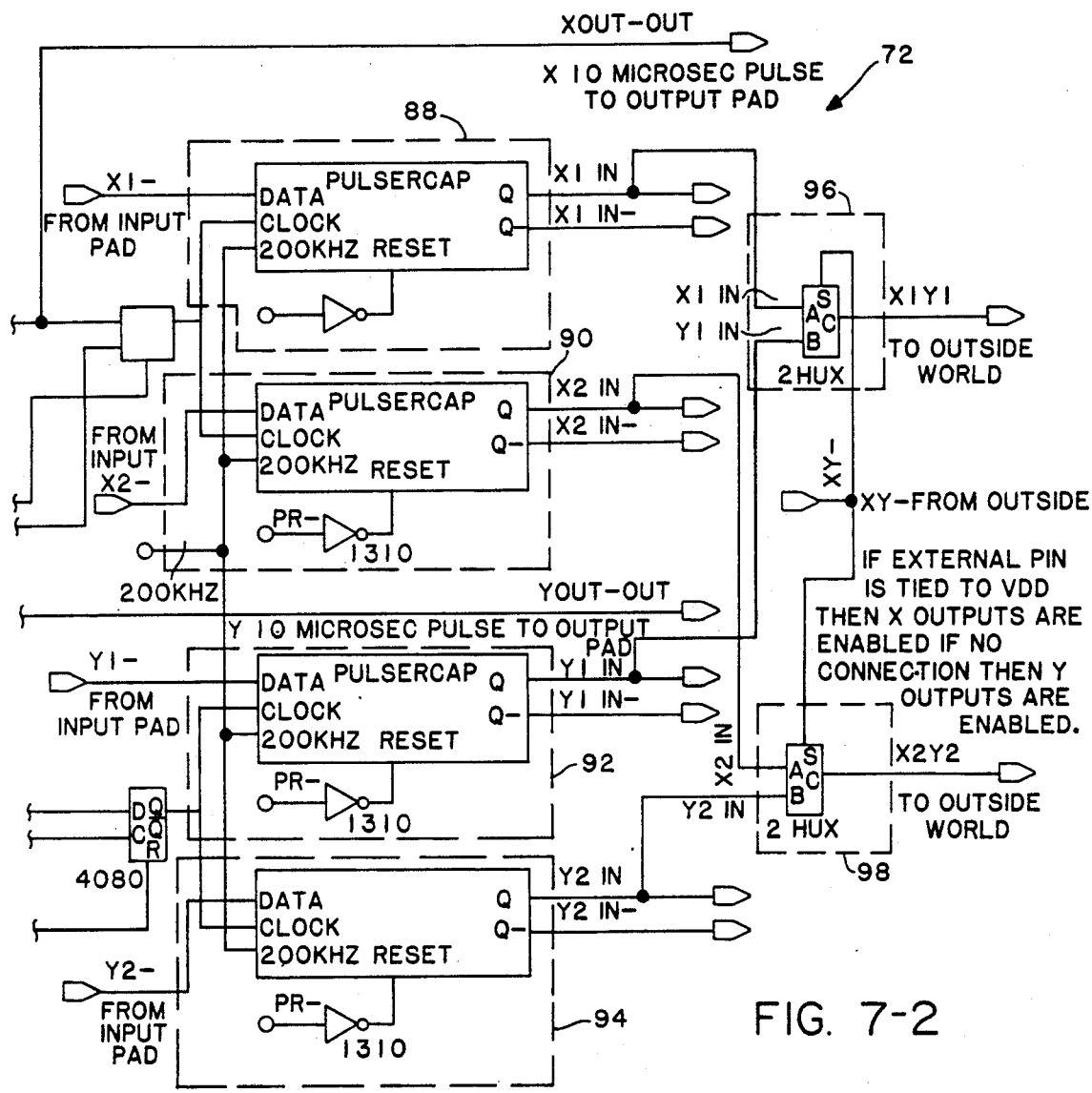

FIG. 7 is a logic diagram of a portion 72 of the mouse portion of the ASIC which illustrates the mechanism for forming the necessary pulse generation. Referring to this figure, it can be seen that the mouse portion 72 of the ASIC 36 can be viewed in terms of modules designated by dashed lines, depending upon function. A clock divider, designated by dashed lines 82, functions to divide down the 200 Khz clock to a 100 Khz clock which is used for the $X_{drive}$ and $Y_{drive}$ pulses. The 100 Khz clock is used to create the 10 μS pulses, as illustrated in FIG. 5. The other relevant frequency from the clock divider is the 6.25 Khz frequency which creates the $X_{drive}$ and $Y_{drive}$ period of 160 μS.

The $X_{drive}$ module, designated by dashed lines 84, illustrates that the $X_{drive}$ is produced by clock frequencies of 6.25 Khz, 6.25 Khz bar, and 100 Khz; and by the circuitry illustrated. This circuitry creates a period of 160 μS and pulse of 10 μS.

The $Y_{drive}$ module, designated by dashed lines 86, illustrates that the $Y_{drive}$ is produced by clock frequencies of 6.25 Khz bar, 6.25 Khz and 100 Khz. This circuitry creates a period of 160 μS and pulse of 10 μS. $Y_{drive}$ is identical to $X_{drive}$ except it is 180° out of phase due to 6.25 Khz going into the NOR gate and 6.25 Khz bar going into the D-flip-flop. ($X_{drive}$ has 6.25 Khz bar going into the NOR gate and 6.25 Khz going into the D-flip-flop.) As noted, this phase difference provides minimized power consumption.

The four pulse recapture modules 88, 90, 92, 94 recapture the output from the phototransistors and form the quadrature waveforms, as described above. Modules 96, 98 represent test pins.

The recaptured outputs from the four recapture modules 88, 90, 92, 94 are then utilized to determine whether there should be cursor movement. The $X1_{In}$ and $X2_{In}$ signal pair is connected to a quadrature state machine which is connected to an up/down counter. The data in the counter is then carried over the data bus to the computer which causes the cursor on the computer screen to move if there is data in the counter. The same scenario, described above, applies to the $Y1_{In}$ and $Y2_{In}$ pair of recaptured signals.

Figure 8:
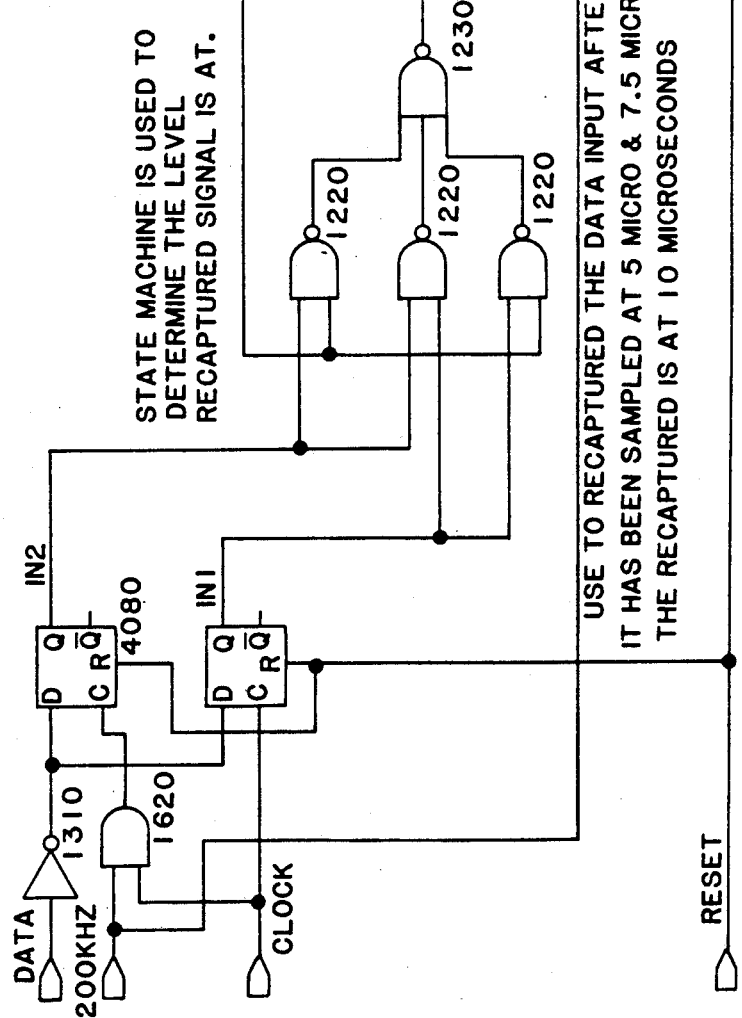
FIG. 8 is a logic diagram of a portion of FIG. 7 specifically directed to the mechanism for performing pulse recapture. (This logic has general implications in addition to the pulse generation scheme illustrated in FIG. 6 and may be utilized with contacting encoders.)

Referring now to FIG. 8, a pulse recapture module, which may represent either any of the modules 88, 90, 92, 94, is illustrated.

The input signal (DATA) from the appropriate phototransistors (see FIGS. 6 and 7) is applied to the 1310 Inverter, the output thereof being applied to the D input of a first RCA 4080 D-flip-flop and the D input of a second RCA 4080 D-flip-flop. These flip-flops are utilized to save the data at the appropriate sampling times as will be disclosed below.

The 200 Khz_ signal from the clock divider, hereinbefore described with reference to FIGS. 6 and 7, is coupled as an input to the 1620 AND gate, and to the Cn input of the RCA 4090 D-flip-flop with inverted clock.

The output of the clock, also described with reference to FIGS. 6 and 7, is coupled as an input to the C input of the second RCA 4080 D-flip-flop and as an input to the RCA 1620 AND gate. The output of the RCA 1620 AND gate is applied to the C input of the first D-flip flop. The Q inputs ($In_1$, $In_2$) from the D-flip-flops are coupled to three RCA 1220 NAND gates, the outputs of which are coupled to the inputs of an RCA 1230 NAND gate, in the sequence illustrated. The R inputs of the 4090 and the 4080 D-flip-flops are coupled to the RESET (see FIGS. 6 and 7). The Q output signal of the 4090 D flip-flop with inverted clock is fed to two of the 1220 NAND gates and also input to one of two RCA 1520 buffing inverters. The $\overline{Q}$ output signal is coupled to the input of the second RCA 1520 inverter. The resulting signals, Q_ and Q, are the presently recaptured signal level, and the presently recaptured signal bar, respectively.

Table II, below, shows the desired transformation of the data $In_2$ and $In_1$, performed by the transformation logic illustrated in FIG. 8.

TABLE II

| $In_1$ | $In_2$ | Q | $Q_{next}$ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

From this table, it can be readily seen that the recaptured signal switches only in the occasion that both $In_1$ and $In_2$ are identical and the present recaptured signal level is different than the identical $In_1$, and $In_2$. This feature prevents undesired jitter of the mouse. As previously noted in the description regarding FIG. 5, the LED pulse (e.g. $X_{drive}$) provides a wave having a pulse length of 10 μS with a period of 160 μS.

In present Applicants' current implementation of the present invention, samples $In_1$ and $In_2$ are taken at μS and 7.5 μS, as illustrated in FIG. 5. (Note that pulse length, period and sample times could have different values.) Since a phototransistor changes substantially instantaneously once it receives enough photons, it changes a lot faster than 2.5 μS. A change of state (from a '1' to a '0' or vice-versa) of the phototransistor is reported if both the samples at 5 μS and 7.5 μS are of the same state (i.e. a '1' and a '1' or a '0' and a '0') and the previous pulse is different (i.e. 5 μS) and 7.5 μS are both a '1' and the previous pulse state, 160 μS earlier is a '0'). Thus, there is no "jitter" on the screen.

Referring now to FIG. 1, it may readily be seen how this flow chart is implemented by the apparatus described in FIGS. 6, 7, and 8. As described in Decision Block 12, there is first an inquiry as to whether a sampling should be performed. In the case of the pulse drive illustrated in FIGS. 6–8, this sampling would take place after the pulse drive has been high for 5 $\mu S$ and 7.5 $\mu S$ of its pulse width. This function is performed by the clock being input into the 4080 D-flip-flops illustrated in FIG. 8. The $In_1$ signal level corresponds to a 5 $\mu S$ sampling, and the $In_2$ level corresponds to a 7.5 $\mu S$ sampling. The 1620 AND gate, in conjunction with the 200 Khz clock provides the desired 2.5 $\mu S$ delay in sampling.

Process Block 13, shown in FIG. 1, which refers to a data input, correlates, for example, to X1 bar in FIG. 7. This, in turn, correlates to DATA shown in FIG. 8.

Each sample is then saved, as shown in Process Blocks 14, 15, in FIG. 1. These correlate to outputs $In_1$ and $In_2$ of the 4080 D-flip-flops.

Referring again to FIG. 1, a query is made as to whether $In_1$ is equal to $In_2$. If the answer is in the affirmative, a comparison is made as to whether the signal level of the previous recaptured pulse is the same as $In_1$ and $In_2$. The queries performed by Decision Blocks 16 and 18, as well as the steps delineated in Process Blocks 17, 19, and 20 are accomplished by the state machine comprising the three 1220 NAND gates, the 1230 NAND gate, and the 4090 D-flip-flop with inverted clock, all illustrated in FIG. 8.

Decision Block 21, as that block is applied with relation to the present implementation, entails an inquiry as to whether the 160 $\mu S$ period has begun. This function is provided by the clock signal illustrated in FIGS. 7 and 8. Process Block 22 is a shift for designating the next period to become the present period when, in fact, a new period has started.

As noted above, the present invention requires the designation of a period of time associated with the predicted rate of movement of the cursor control device. In the present implementation, such period of time has been deemed to be 160 $\mu S$. The period specified for sampling should be based, in part, on the speed required for the cursor on the computer to move and counts per distance required of the input cursor control device. An example of such a determination is explained below with respect to the Apple Computer Inc.'s Desktop Bus (ADB) mouse. The mouse is required to count at 200 counts per inch in 4-count quadrature, is able to travel at 10 inches per second, and still maintain 200 counts per inch. When the mouse moves 1 inch (by displacement of the user's hand) the encoding disc inside the mouse rotates 1.25 times. The encoding disc has 40 open slots. Thus, the number of slots seen by a phototransistor, in an optical encoding method, would be 50 for 1 inch of travel. Four counts comprise a full quadrature. In other words, there are 4 counts from one slot to the beginning of the next slot. Therefore, there are 200 counts per inch for 50 slots. Inasmuch as the required speed is 10 inches per second, this correlates to 2,000 counts per second.

The speed of the aperture wheel, to go 2,000 counts per second, is determined by the circumference of the encoding wheel and the number of slots in the wheel. The circumference is equal to $\pi$ times diameter, is equal to $\pi$ times 0.646 inches, is equal to 2.3 inches. The distance of a slot to an adjacent slot is 0.05 inches. The distance the aperture wheel turns is 2.5 inches per every inch of travel of the mouse. Thus, aperture distance turned for 10 inches of mouse travel is 25 inches for every one second at maximum allowable speed. Therefore, the fastest a slot to the next slot has to move (for 200 counts per inch at 10 inches per second) is 0.05 inches times 1 second divided by 25 inches is equal to 0.002 seconds or 2 milliseconds.

For the slot to slot cycle (2 millisecond cycle) it can be predicted how long the period of time should be in which samples are taken. During a half cycle of the cycle described above, the speed of 1 millisecond must be met. It is good design practice to have greater than 2 sample periods for this 1 millisecond. Thus, a desired designated period of time should be in the order of less than 500 $\mu Sec$. Utilizing this time frame, present Applicants set a period of 160 $\mu S$ and the sampling times at 5 $\mu S$ and 7.5 $\mu S$.

Thus, it can be seen that the period for the sampling depends on the size of the encoding disc and the number of slots in the encoding disc. In addition, such a determination of the period for sampling also depends on the required counts per inch of movement of the cursor control device and speed of movement of the cursor control device.

IV. Other Preferred Embodiments

As noted, the apparatus and method of the present invention is particularly adapted for use with co-Applicant P. M. Donovan's invention utilizing synchronous pulsing of the phototransistors and light emitting diodes (i.e. U.S. Ser. No. 07/357,419). For this reason, the invention has been described in connection with that particular use. However, it is emphasized that the invention has broader utility, for example, with optical encoding means which do not include pulsing of the LEDs. Additionally, the present invention may be utilized with cursor control devices which use contact encoder schemes instead of optical encoding means. In view of the above noted broader utility of the invention, it will be understood that the aforementioned application involving a pulsed input is purely illustrative and not limiting in nature.

Figure 9:
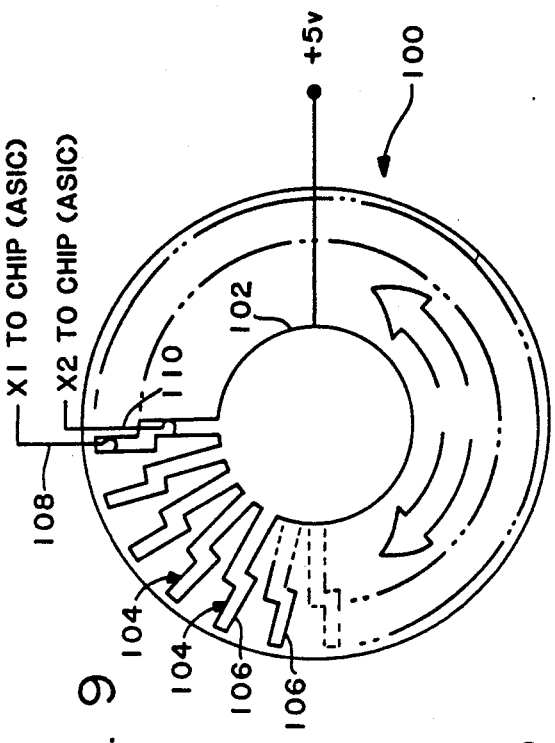
FIG. 9 is a schematic illustration of a contacting encoder which may utilize the inventive concepts disclosed herein.

Specifically, with respect to contact encoders, the reader's attention is directed to FIG. 9 which illustrates an encoder disc, designated generally as 100. An encoder disc or encoder wheel 100 for a contact encoder works similarly in many respects to the aperture wheel for optical encoders. However, the encoder wheel 100 includes a "common" or central portion 102 which has equally spaced radially extending arms 104 extending therefrom. Each element has an offset end 106. Stationary pick-off brushes 108, 110 are disposed so as to contact the radially extending arms 104 at offset locations, as the encoder wheel 100 rotates, as shown. Each pick-off brush 108, 110 provides input signals to the ASIC or appropriate microcontroller. The two brushes 108, 110 and the encoder wheel 100 are designed so as to allow quadrature signals (electrical) as inputs to the ASIC or microcontroller.

As with the optical encoder previously described, two encoder discs may be utilized, one for the X direction and one for the Y direction. Thus, there is an X1 input to the ASIC, an X2 input to the ASIC, a Y1 input to the ASIC, and a Y2 input to the ASIC. The pulse recapture scheme is therefore the same as in the previous embodiment.

Specifically, with respect to instances where reduced power consumption is not required, yet an optical encoding scheme still desired, the pulsed optical encoding method described above may not be used. However, the principles of the present invention are still applicable. In this case, the photoemitters and photodetectors are powered directly by a power line (with a current limiting resistor), and a complex pulsing system is not utilized. The pulse recapture scheme, described above, is equally applicable in this instance. At least two samples should be taken for a designated period of time so as to allow a comparison of the samples with the previously recaptured signal level, as shown in FIG. 8, thus detecting a valid signal for quadrature.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of minimizing undesired cursor movement in a computer controlled display system, comprising the steps of:
   (a) providing a cursor control device capable of generating an electrical signal indicative of a position of said cursor control device;
   (b) sampling at least two temporally spaced portions of said electrical signal, each of said portions being within a designated period of time, said period of time being a function of the predicted rate of movement of said cursor control device;
   (c) comparing said at least two temporally spaced portions with each other and to an electrical signal previously sampled; and
   (d) analyzing said comparisons for determining whether the cursor should be signaled to move on the display of said computer controlled display system.

2. The method of claim 1 wherein the step of sampling includes the steps of:
   (a) saving a first portion, $In_1$, of said electrical signal; and
   (b) saving a second portion, $In_2$, of said electrical signal, said first and second portions corresponding respectively to said at least two temporally spaced portions and said second portion being temporally spaced in substantially close proximity to said first portion.

3. The method of claim 2 wherein said analyzing and comparing steps include the steps of:
   (a) determining whether $In_1$ is equal to $In_2$;
   (b) determining whether $In_1$ and $In_2$ are equal to said electrical signal previously sampled, when the determination in step (a), above, is in the affirmative; and
   (c) signaling said cursor to move when the determination in step (a), above, is in the affirmative, and the determination in step (b), above, is in the negative.

4. The method of claim 2 wherein said analyzing and comparing steps include the steps of:
   (a) determining whether $In_1$ is equal to $In_2$; and
   (b) maintaining the cursor in a stationary position when the determination in step (a), above, is in the negative.

5. The method of claim 2 wherein said analyzing and comparing steps include the steps of:
   (a) determining whether $In_1$ is equal to $In_2$;
   (b) determining whether $In_1$ and $In_2$ are equal to said electrical signal previously sampled, when the determination in step (a), above, is in the affirmative; and
   (c) maintaining the cursor in a stationary position when the determination in step (b), above, is in the affirmative.

6. The method of claim 1 wherein said step of providing a cursor control device includes providing such a device with an X-axis optical encoding assembly for encoding along an X-direction and a Y-axis optical encoding assembly for encoding along a Y-direction, each encoding assembly including;
   (a) electrical input means for providing a pulsed electrical input signal;
   (b) light source means connected to said electrical input means for utilizing said pulsed electrical input signal to produce pulses of light;
   (c) light collecting and electrical conducting means being in pulsed synchronization with said light source means, said light collecting and electrical conducting means being positioned in relation to said light source means for receiving and being responsive to light being produced by said light source means, and for producing an electrical output signal as an indication of such a response; and,
   (d) positionable light interrupting means for opening and closing the optical path of light being transmitted from said light source means to said light collecting and electrical conducting means sufficiently so as to affect said electrical output signal, the position of said light interrupting means being affected by a change in position of said cursor control device, the resulting pulsed output signal of said light collecting and electrical conducting means for providing indications of locations on the computer control display system, the device resulting in minimized power consumption as a result of the pulsed synchronization of said light source means and said light collecting and electrical conducting means.

7. The method of claim 6 wherein said step of sampling includes the steps of:
   (a) saving a first portion, $In_1$, of said electrical output signal; and
   (b) saving a second portion, $In_2$, of said electrical output signal, said first and second portions corresponding respectively to said at least two temporally spaced portions and said second portion being temporally spaced in substantially close proximity to said first portion.

8. The method of claim 7 wherein said analyzing and comparing steps include the steps of:
   (a) determining whether $In_1$ is equal to $In_2$;
   (b) determining whether $In_1$ and $In_2$ are equal to said electrical signal previously sampled, when the determination in step (a), above, is in the affirmative; and
   (c) signaling said cursor to move when the determination in step (a), above, is in the affirmative, and the determination in step (b), above, is in the negative.

9. The method of claim 7 wherein said analyzing and comparing steps include the steps of:
   (a) determining whether $In_1$ is equal to $In_2$; and
   (b) maintaining the cursor in a stationary position when the determination in step (a), above, is in the negative.

10. The method of claim 7 wherein said analyzing and comparing steps include the steps of:
    (a) determining whether $In_1$ is equal to $In_2$;
    (b) determining whether $In_1$ and $In_2$ are equal to said electrical signal previously sampled, when the determination in step (a), above, is in the affirmative; and
    (c) maintaining the cursor in a stationary position when the determination in step (b), above, is in the affirmative.

11. The method of claim 1 wherein said step of providing a cursor control device includes providing such a device with an X-axis optical encoding assembly for encoding along an X-direction and a Y-axis optical encoding assembly for encoding along a Y-direction, each encoding assembly including;
 (a) electrical input means for providing an electrical input signal;
 (b) light source means connected to said electrical input means for utilizing said electrical input signal to produce pulses of light;
 (c) light collecting and electrical conducting means being positioned in relation to said light source means for receiving and being responsive to light being produced by said light source means, and for producing an electrical output signal as an indication of such a response; and,
 (d) positionable light interrupting means for opening and closing the optical path of light being transmitted from said light source means to said light collecting and electrical conducting means sufficiently so as to affect said electrical output signal, the position of said light interrupting means being affected by a change in position of said cursor control device, the resulting output signal of said light collecting and electrical conducting means for providing indications of locations on the computer controlled display system.

12. The method of claim 11 wherein said step of sampling included the steps of:
 (a) saving a first portion, $In_1$, of said electrical output signal; and
 (b) saving a second portion, $In_2$, of said electrical output signal, said first and second portions corresponding respectively to said at least two temporally spaced portions and said second portion being temporally spaced in substantially close proximity to said first portion.

13. The method of claim 12 wherein said analyzing and comparing steps includes the steps of:
 (a) determining whether $In_1$ is equal to $In_2$;
 (b) determining whether $In_1$ and $In_2$ are equal to said electrical signal previously sampled, when the determination in step (a), above, is in the affirmative; and
 (c) signaling said cursor to move when the determination in step (a), above, is in the affirmative, and the determination in step (b), above, is in the negative.

14. The method of claim 12 wherein said analyzing and comparing steps include the steps of:
 (a) determining whether $In_1$ is equal to $In_2$; and
 (b) maintaining the cursor in a stationary position when the determination in step (a), above, is in the negative.

15. The method of claim 12 wherein said analyzing and comparing steps include the steps of:
 (a) determining whether $In_1$ is equal to $In_2$;
 (b) determining whether $In_1$ and $In_2$ are equal to said electrical signal previously sampled, when the determination in step (a), above, is in the affirmative; and
 (c) maintaining the cursor in a stationary position when the determination in step (b), above, is in the affirmative.

16. The method of claim 1 wherein said electrical signal generated is provided by a contact encoder.

17. An apparatus for minimizing undesired cursor movement in a computer controlled display system, comprising:
 (a) a cursor control device capable of generating an electrical signal indicative of a position of said cursor control device;
 (b) means for sampling at least two temporally spaced portions of said electrical signal, each of said portions being within a designated period of time, said period of time being a function of the predicted rate of movement of said cursor control device;
 (c) means for comparing said at least two temporally spaced portions with each other and to an electrical signal previously sampled; and
 (d) means for analyzing said comparisons for determining whether the cursor should be signaled to move on the display of said computer controlled display system.

18. The apparatus of claim 17 wherein said means for sampling includes:
 (a) means for saving a first portion, $In_1$, of said electrical signal; and
 (b) means for saving a second portion, $In_2$, of said electrical signal, said first and second portions corresponding respectively to said at least two temporally spaced portions and said second portion being temporally spaced in substantially close proximity to said first portion.

19. The apparatus of claim 18 wherein said means for analyzing and comparing include:
 (a) means for determining whether $In_1$ is equal to $In_2$;
 (b) means for determining whether $In_1$ and $In_2$ are equal to said electrical signal previously sampled, when the determination in step (a), above, is in the affirmative; and
 (c) means for signaling said cursor to move when both the determination by element (a), above, is in the affirmative and the determination by element (b), above, is in the negative.

20. The apparatus of claim 18 wherein said means for analyzing and comparing include:
 (a) means for determining whether $In_1$ is equal to $In_2$; and
 (b) means for maintaining the cursor in a stationary position when the determination by element (a), above, is in the negative.

21. The apparatus of claim 18 wherein said means for analyzing and comparing include:
 (a) means for determining whether $In_1$ is equal to $In_2$;
 (b) means for determining whether $In_1$ and $In_2$ are equal to said electrical signal previously sampled, when the determination by element (a), above, is in the affirmative; and
 (c) means for maintaining the cursor in a stationary position when the determination by element (b), above, is in the affirmative.

22. The apparatus of claim 17 wherein said cursor control device includes an X-axis optical encoding assembly for encoding along an X-direction and a Y-axis optical encoding assembly for encoding along a Y-direction, each encoding assembly including;
 (a) electrical input means for providing a pulsed electrical input signal;
 (b) light source means connected to said electrical input means for utilizing said pulsed electrical input signal to produce pulses of light;
 (c) light collecting and electrical conducting means being in pulsed synchronization with said light source means, said light collecting and electrical conducting means being positioned in relation to said light source means for receiving and being responsive to light being produced by said light source means, and for producing an electrical output signal as an indication of such a response; and, (d) positionable light interrupting means for opening and closing the optical path of light being transmitted from said light source means to said light collecting and electrical conducting means sufficiently so as to affect said electrical output signal, the position of said light interrupting means being affected by a change in position of said cursor control device, the resulting pulsed output signal of said light collecting and electrical conducting means for providing indications of locations on the computer control display system, the device resulting in minimized power consumption as a result of the pulsed synchronization of said light source means and said light collecting and electrical conducting means.

23. The apparatus of claim 22 wherein said means for sampling includes:
(a) means for saving a first portion, $In_1$, of said electrical output signal; and
(b) means for saving a second portion, $In_2$, of said electrical output signal, said first and second portions corresponding respectively to said at least two temporally spaced portions and said second portion being temporally spaced in substantially close proximity to said first portion.

24. The apparatus of claim 23 wherein said means for analyzing and comparing includes:
(a) means for determining whether $In_1$ is equal to $In_2$;
(b) means for determining whether $In_1$ and $In_2$ are equal to said electrical signal previously sampled, when the determination by element (a), above, is in the affirmative; and
(c) means for signaling said cursor to move when both the determination by element (a), above, is in the affirmative and the determination by element (b), above, is in the negative.

25. The apparatus of claim 23 wherein said means for analyzing and comparing include:
(a) means for determining whether $In_1$ is equal to $In_2$; and
(b) means for maintaining the cursor in a stationary position when the determination provided by element (a), above, is in the negative.

26. The apparatus of claim 23 wherein said means for analyzing and comparing include:
(a) means for determining whether $In_1$ is equal to $In_2$;
(b) means for determining whether $In_1$ and $In_2$ are equal to said electrical signal previously sampled, when the determination in element (a), above, is in the affirmative; and
(c) means for maintaining the cursor in a stationary position when the determination provided by element (b), above, is in the affirmative.

27. The apparatus of claim 17 wherein said cursor control device includes an X-axis optical encoding assembly for encoding along an X-direction and a Y-axis optical encoding assembly for encoding along a Y-direction, each encoding assembly including;
(a) electrical input means for providing an electrical input signal;
(b) light source means connected to said electrical input means for utilizing said electrical input signal to produce pulses of light;
(c) light collecting and electrical conducting means being positioned in relation to said light source means for receiving and being responsive to light being produced by said light source means, and for producing an electrical output signal as an indication of such a response; and,
(d) positionable light interrupting means for opening and closing the optical path of light being transmitted from said light source means to said light collecting and electrical conducting means sufficiently so as to affect said electrical output signal, the position of said light interrupting means being affected by a change in position of said cursor control device, the resulting output signal of said light collecting and electrical conducting means for providing indications of locations on the computer controlled display system.

28. The apparatus of claim 27 wherein said means for sampling includes:
(a) means for saving a first portion, $In_1$, of said electrical output signal; and
(b) means for saving a second portion, $In_2$, of said electrical output signal, said first and second portions corresponding respectively to said at least two temporally spaced portions and said second portion being temporally spaced in substantially close proximity to said first portion.

29. The apparatus of claim 28 wherein said means for analyzing and comparing include:
(a) means for determining whether $In_1$ is equal to $In_2$;
(b) means for determining whether $In_1$ and $In_2$ are equal to said electrical signal previously sampled, when the determination provided by element (a), above, is in the affirmative; and
(c) means for signaling said cursor to move when both the determination by element (a), above, is in the affirmative and the determination by element (b), above, is in the negative.

30. The apparatus of claim 28 wherein said means for analyzing and comparing include:
(a) means for determining whether $In_1$ is equal to $In_2$; and
(b) means for maintaining the cursor in a stationary position when the determination by element (a), above, is in the negative.

31. The apparatus of claim 28 wherein said means for analyzing and comparing include:
(a) means for determining whether $In_1$ is equal to $In_2$;
(b) means for determining whether $In_1$ and $In_2$ are equal to said electrical signal previously sampled, when the determination provided by element (a), above, is in the affirmative; and
(c) means for maintaining the cursor in a stationary position when the determination provided by element (b), above, is in the affirmative.

32. The apparatus of claim 17 wherein said cursor control device includes a contact encoder.

* * * * *